United States Patent
Shimizu et al.

[19]

[11] Patent Number: 5,943,444
[45] Date of Patent: Aug. 24, 1999

[54] IMAGE REPRODUCING APPARATUS

[75] Inventors: Tetsuya Shimizu, Yokohama; Hidenori Hoshi, Kawasaki; Shinji Ohnishi, Yokohama, all of Japan

[73] Assignee: Canon Kabushiki Kaisha, Tokyo, Japan

[21] Appl. No.: 08/729,519

[22] Filed: Oct. 11, 1996

Related U.S. Application Data

[63] Continuation of application No. 08/219,544, Mar. 29, 1994, abandoned.

[30] Foreign Application Priority Data

Mar. 31, 1993 [JP] Japan .................................. 5-074035
Jun. 24, 1993 [JP] Japan .................................. 5-153619

[51] Int. Cl.⁶ .................................................. G06K 9/03
[52] U.S. Cl. .......................... 382/236; 382/309; 382/233; 348/407; 348/616; 386/47
[58] Field of Search .................................. 382/236, 250, 382/309, 233; 348/402, 407, 416, 616, 466; 386/2, 4, 7, 51, 47

[56] References Cited

U.S. PATENT DOCUMENTS

| | | | |
|---|---|---|---|
| 4,656,514 | 4/1987 | Wilkinson et al. | 348/616 |
| 4,807,033 | 2/1989 | Keesen et al. | 348/407 |
| 5,150,210 | 9/1992 | Hoshi et al. | 348/413 |
| 5,247,363 | 9/1993 | Sun et al. | 348/616 |
| 5,400,076 | 3/1995 | Iwamura | 348/416 |
| 5,420,872 | 5/1995 | Hyodo et al. | 348/616 |
| 5,455,629 | 10/1995 | Sun et al. | 348/466 |

OTHER PUBLICATIONS

Sun et al. "Error Concealment in Digital Simulcast AD–HDTV Decoder." IEEE Trans. Consumer Electronics, vol.38, no.3, pp. 108–118, Jun. 1992.

Jeng et al. "Concealment of Bit Error and Cell Loss in Inter–Frame Coded Video Transmission." ICC91, vol 1, pp. 496–500, Jun. 1991.

Zhu et al. "Coding and Cell–Loss Recovery in DCT–based Packet Video." IEEE Trans. on Circuits and Systems for Video Technology, vol. 3, No. 3 pp. 248–258, Jun. 1993.

*Primary Examiner*—Jon Chang
*Attorney, Agent, or Firm*—Fitzpatrick, Cella, Harper & Scinto

[57] ABSTRACT

A construction circuit which constructs data of nondecodable blocks by using interpolation data generated by a predetermined method, a movement estimation circuit which estimates the movement of the nondecodable blocks on the basis of the movement of the blocks surrounding the nondecodable block, and an error pattern detecting circuit which detects an error state of the surrounding blocks and controls the movement estimation circuit on the basis of the error state, are provided. The construction circuit constructs nondecodable data on the basis of the result of the estimation by the movement estimation circuit. An image reproducing apparatus is provided which is capable of obtaining a reproduced image having reduced visual deterioration by estimating movement on the basis of the blocks surrounding the nondecodable block when the data of the nondecodable block is reproduced and detecting the error state of the adjacent blocks.

18 Claims, 15 Drawing Sheets n   #n-1

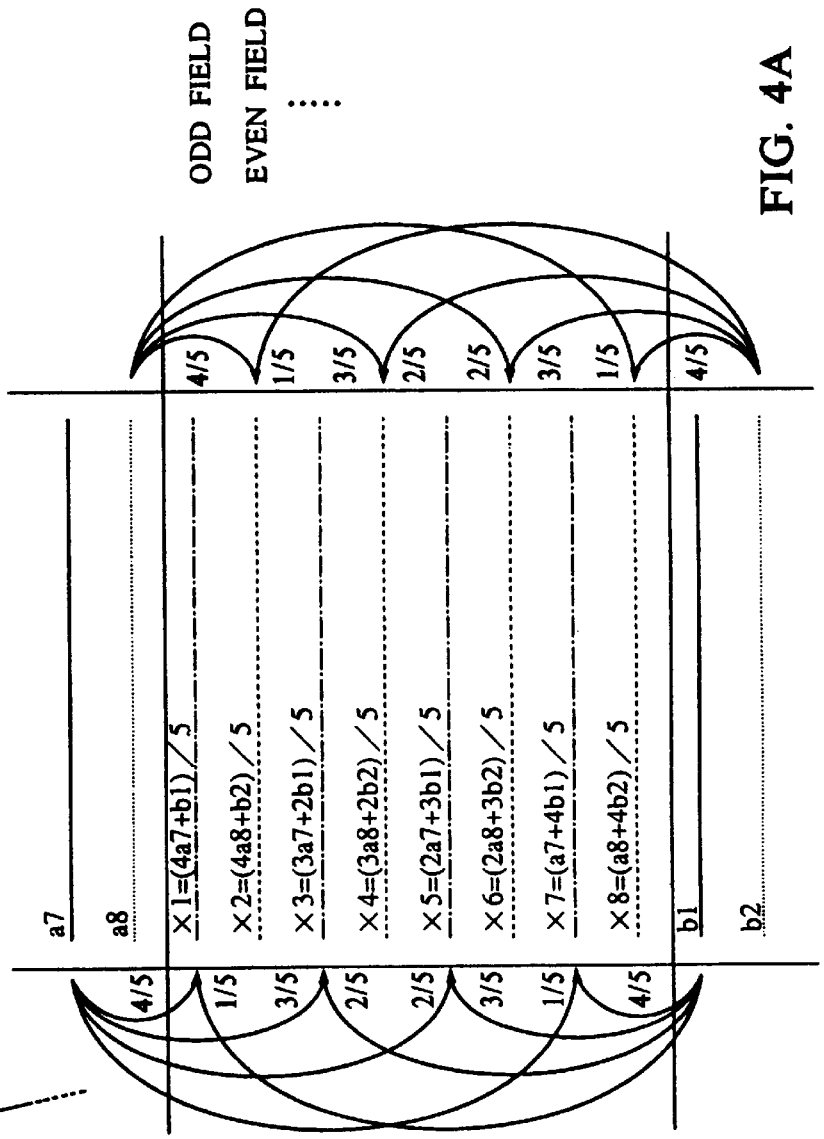
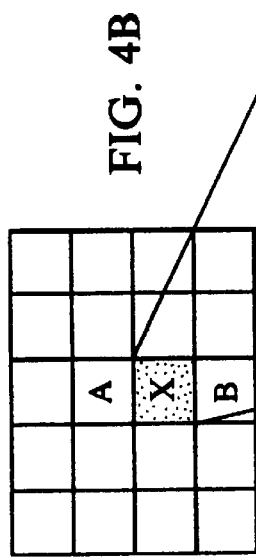
FIG. 4A
FIG. 4B

FIG. 11

| | ERROR FLAG | INTRA-FIELD INTERPOLATION FLAG | INTER-FRAME INTERPOLATION FLAG | MOVEMENT DATA |
|---|---|---|---|---|
| A | H | H | — | H |
| B | H | H | L | L |

| | ERROR FLAG | INTRA-FIELD INTERPOLATION FLAG | MOVEMENT DATA |
|---|---|---|---|
| A | H | H | H |

IMAGE REPRODUCING APPARATUS

This application is a continuation of application Ser. No. 08/219,544 filed Mar. 29, 1994, now abandoned.

BACKGROUND OF THE INVENTION

1. Field of the Invention

The present invention relates to an image reproducing apparatus and, more particularly, to an image reproducing apparatus for correcting and reproducing nondecodable data of video signals encoded at high efficiency.

2. Description of the Related Art

An orthogonal transform coding method is known as a technique for compressing and expanding image signals at high efficiency. In this method, image signals are collectively formed into blocks, each block consisting of a predetermined number of pixels, and then an orthogonal transform, such as a discrete cosine transform, is performed so that quantization, entropy coding, and the like, are performed on coefficients after the transformation. In this method, since coding is performed in block units, when an error occurs in the coded data, the coding errors occur in block units. Also, since variable length codes are often used, decoding errors propagate over several blocks, resulting in significant deterioration of the image.

Hitherto, as means for correcting such error blocks by interpolation and obtaining reproduced images, inter-frame interpolation, wherein error blocks are replaced by using an image information from the preceeding frame has been utilized.

A correction operation using inter-frame interpolation is shown in FIG. 1. If block X of frame #n cannot be reproduced, inter-frame interpolation is performed by a method in which data of block X is replaced with reproduced data of block A, in the previous frame #n−1, at the same position on the screen, and the image is reproduced.

However, in such inter-frame interpolation, when the image moves violently from one frame to the next, interpolation data deviates, in terms of time, from the image data of the adjacent blocks within the same field, and the substituted data is completely different from the original image data. Therefore, when the data of the error block is replaced with the interpolation data, the resulting image may appear quite different from the way it should. It is also conceivable that image data in the same field may be used as interpolation data. In such a case, however, although there is a better correlation in terms of time, as compared with inter-frame interpolation, the correlation is decreased in terms of space, that is, using data from a different position on the screen but within the same field may cause the substituted data to be completely different from the original data.

Therefore, it is conceivable that the movement of blocks which cannot be reproduced may be estimated by using image data in the blocks above, below, to the left and to the right of the nonreproducible block, and the inter-frame and intra-field interpolations are switched in accordance with the movement of the image. In such a case, however, since the movement of the nonreproducible blocks is estimated by using only the upper, lower and the left and right blocks, it is likely to make an erroneous movement estimation, and there is a possibility that the interpolation will be performed using data having low correlation, contrary to what is desired.

SUMMARY OF THE INVENTION

In view of the above-described circumstances, it is an object of the present invention to solve the above-described problems of the prior art.

It is another object of the present invention to provide an image reproducing apparatus capable of detecting the movement of nonreproducible blocks, with a high degree of accuracy, and obtaining an image having reduced visual deterioration.

To achieve the above-described objects, according to one aspect of the present invention, there is provided an image reproducing apparatus, comprising: reproducing means for reproducing image signals from a recording medium; error correcting means for correcting errors of image signals reproduced by the reproducing means; constructing means for constructing image signals with respect to uncorrectable image signals, which cannot be corrected by the error correcting means; and control means for controlling the image signal construction operation of the constructing means on the basis of the error correction state of the image signals surrounding the uncorrectable image signals.

It is still another object of the present invention to provide an image reproducing apparatus capable of constructing data of nondecodable blocks by using data having high correlation, in terms of time, even when a part of the blocks is no nondecodable.

To achieve the above-described object, according to another aspect of the present invention, there is provided an image reproducing apparatus, comprising: reproducing means for reproducing coded image signals; decoding means for decoding image signals reproduced by the reproducing means; constructing means for constructing image signals, for target image signals, in the image signals decoded by the decoding means, the constructing means constructing the image signals by using image signals surrounding the target signals; detecting means for detecting the movement of the target image signals; decoded state detecting means for detecting the decoded state of the image signals surrounding the target signals; and selecting means for selecting image signals used by the constructing means on the basis of the output from the movement detecting means and the decoded state detecting means, wherein the constructing means constructs the target image signals by using image signals selected by the selecting means.

The above and further objects, aspects and novel features of the invention will become more fully apparent from the following detailed description, read in connection with the accompanying drawings. It is to be expressly understood, however, that the drawings are for the purpose of illustration only and are not intended to limit the invention.

BRIEF DESCRIPTION OF THE DRAWINGS

FIG. 4 is an illustration of an intra-field interpolation in accordance with the first embodiment of the present invention;

FIG. 11 is an illustration of the operation of an output determination circuit in the apparatus of FIG. 7;

DETAILED DESCRIPTION OF THE PREFERRED EMBODIMENTS

Preferred embodiments of the present invention will be explained below, in detail, with reference to the accompanying drawings.

Figure 1:
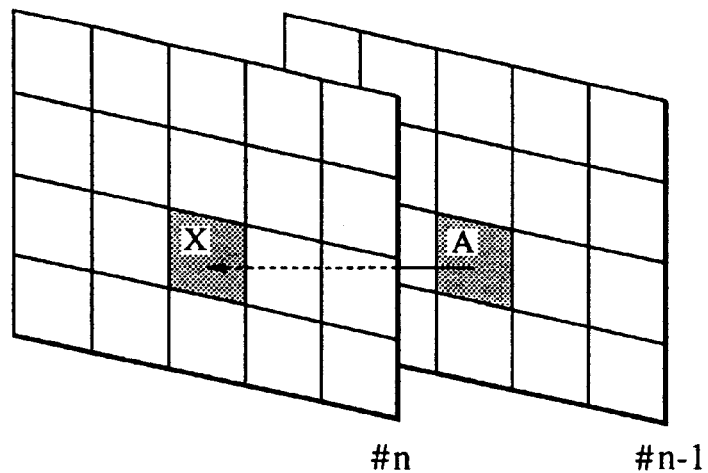
FIG. 1 is an illustration of an inter-frame interpolation operation.
Figure 2:
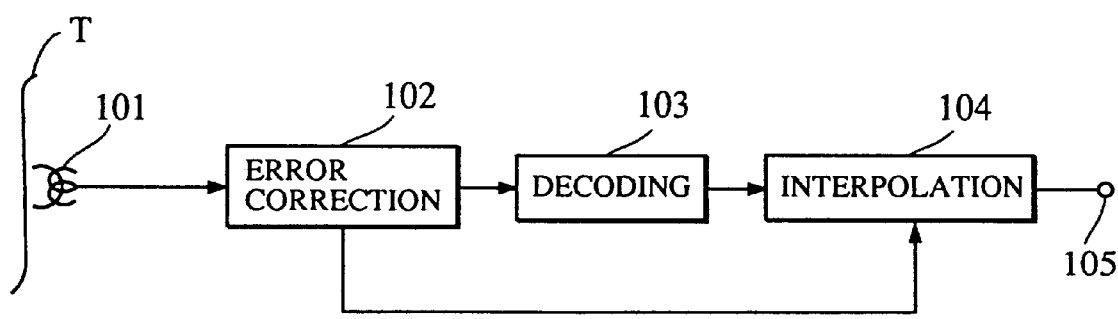
FIG. 2 is a block diagram illustrating the construction of a digital VTR in accordance with one embodiment of the present invention.

FIG. 2 is a block diagram illustrating the construction of a digital VTR, serving as an image reproducing apparatus, in accordance with the first embodiment of the present invention. In FIG. 2, after an error correction circuit 102 performs code error correction on image data, reproduced from a magnetic tape T by a reproducing head 101, the image data is output to a decoding circuit 103. When data is uncorrectable, the error correction circuit 102 outputs a flag indicating that fact to an interpolation circuit 104. The decoding circuit 103 performs well-known expansion and decoding operations, such as reverse DCT, on the image data from the error correction circuit 102, and outputs the image data to the interpolation circuit 104. The interpolation circuit 104 performs an interpolation operation on input data, as will be described below, and outputs it from an output terminal 105.

Figure 3:
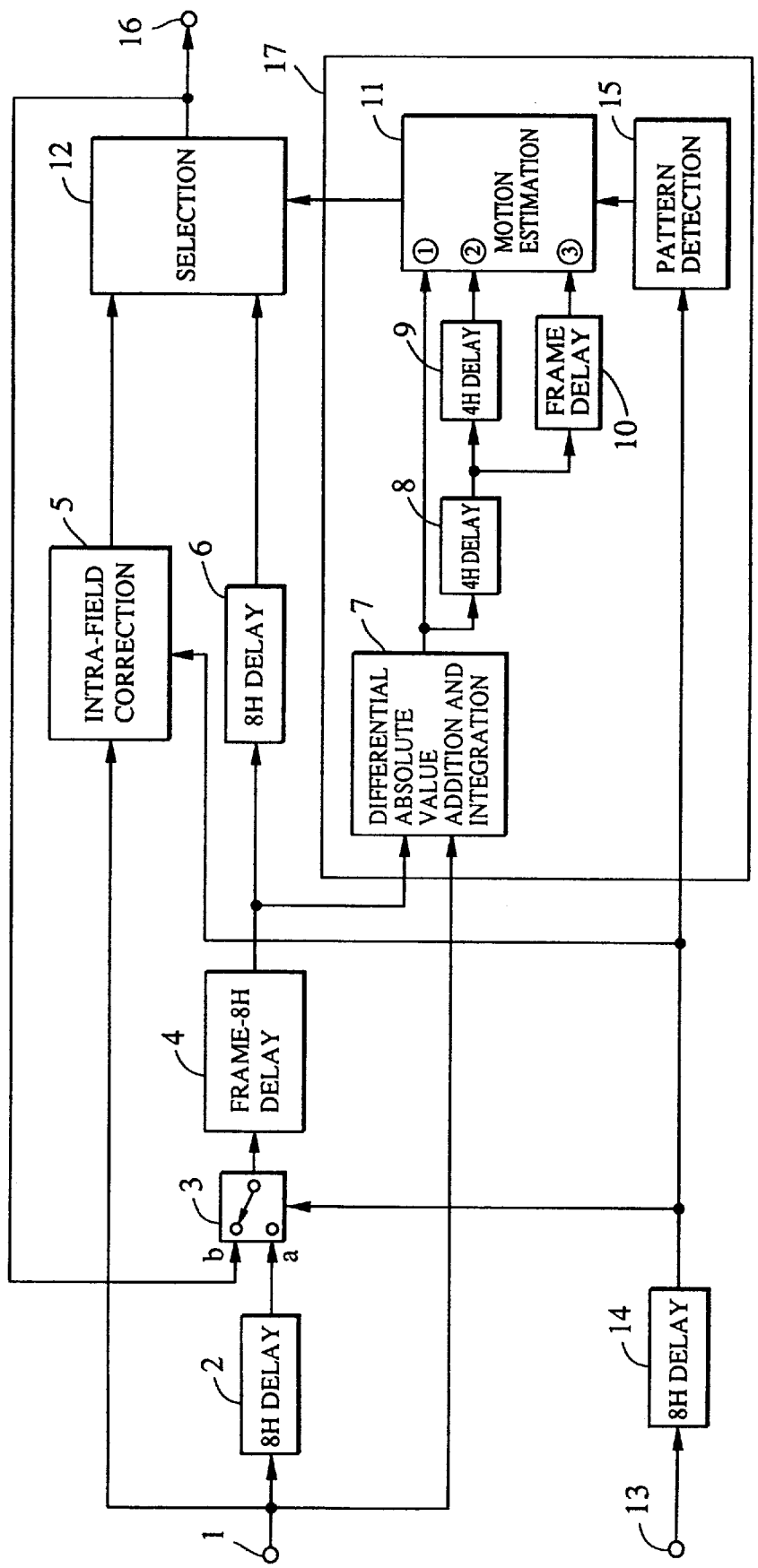
FIG. 3 is a block diagram illustrating the construction of an interpolation circuit of the apparatus of FIG. 2.
Figure 5:
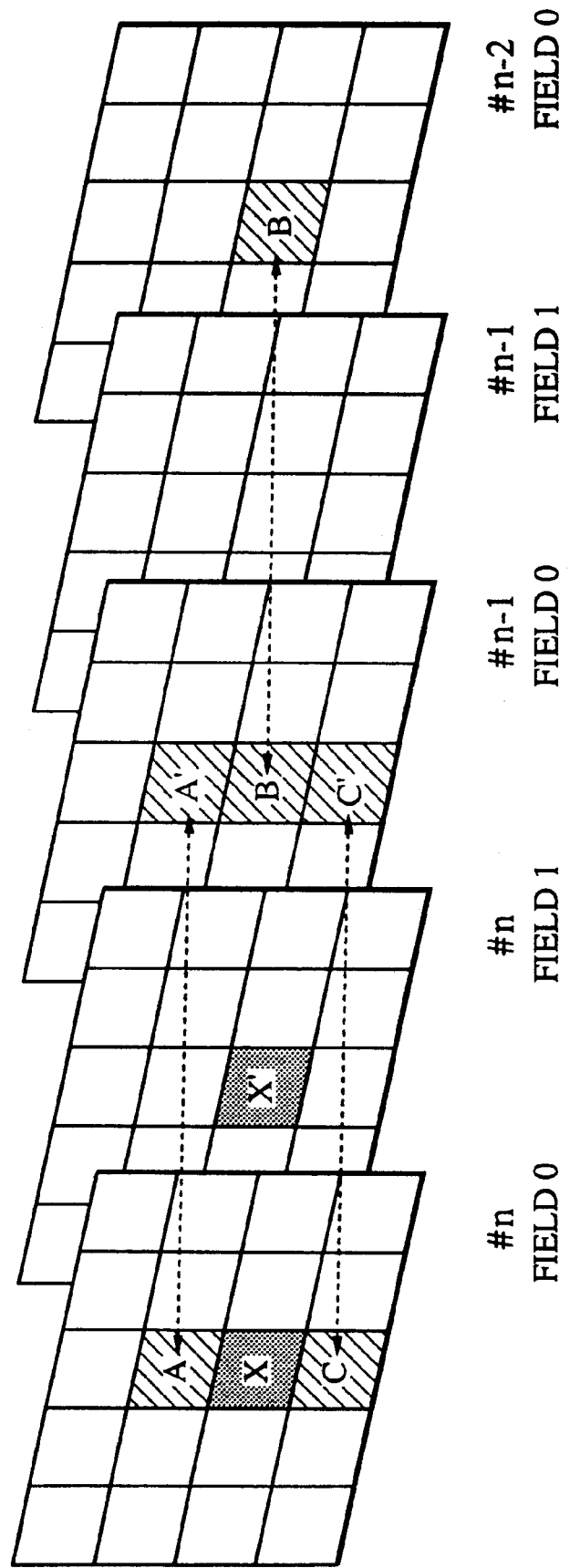
FIG. 5 is an illustration of a movement estimation operation in accordance with the first embodiment of the present invention.

Next, the interpolation circuit 104 will be explained with reference to FIGS. 3 to 5. FIG. 3 is a block diagram illustrating the construction of an interpolation circuit in the digital VTR in accordance with the first embodiment of the present invention. FIG. 4 is an illustration of the state of image data within the blocks. FIG. 5 is an illustration of the relationship between error blocks and motion detection blocks.

In this embodiment, it is assumed that the coded blocks of image signals are coded at 8×8 pixels (line) within the frame. In FIG. 3, image signals which are error corrected and decoded by an error correcting operation such as, for example, Reed-Solomon product coding, are input from a data input terminal 1 in units of 8 bits in order of normal interlace scanning. At the same time, with respect to non-decodable data (error data), which is determined to be uncorrectable by the above-described error correcting operation, a one-bit error flag is input from an error flag input terminal 13, in synchronization with the input data, in byte units. This error flag makes it possible to determine which image data is error data. Since the operations that follow are performed in order of interlace scanning, 8 (horizontal)×4 (vertical) pixels are handled as units of processing blocks for each field.

Data input from the data input terminal 1 is sent to an intra-field correction circuit 5, an 8H delay circuit 2, and a differential absolute-value adding and integrating circuit 7. An error flag input from the error flag input terminal 13 is sent to an 8H delay circuit 14. The input data and the error flag are delayed by 8 lines by the 8H delay circuits 2 and 14, respectively. This delay is determined by taking into consideration the time required to correct image data (which will be described later) so that the timing is adjusted for input of the image data and the error flag.

The error flag, together with input data, is input to the intra-field correction circuit 5 from the 8H delay circuit 14. In the intra-field correction circuit 5, intra-field interpolation is performed on error data by using correctly decoded data within the same field. A description will now be given of the intra-field interpolation operation, in the intra-field correction circuit 5, with reference to FIG. 4. It is now assumed that block X in FIG. 4 is a nondecodable block (hereinafter referred to as an error block). As described earlier, operations are performed in field units in this embodiment. Therefore, odd-number field lines x1, x3, x5 and x7 of the error block X are subjected to an intra-field linear interpolation by using line a7 of block A, which is the line in the same field nearest to the topmost line x1 of the odd-number fields, and line b1 of block B, which is the line in the same field nearest to the bottommost line x7, from among lines of correctly decoded blocks (in this embodiment, blocks A and B).

After the interpolation operation is terminated for the odd-number fields, the interpolation operation for the even-number fields is performed. Even-number field lines x2, x4, x6 and x8, of the error block X, are subjected to an intra-field linear interpolation by using line a8 of block A and line b2 of block B in the same way as for the odd-number field lines. That is, data of each line of block X is calculated as $x1=(4\times a7+b1)/5$, $x3=(3\times a7+2\times b1)/5$, $x5=(2\times a7+3\times b1)/5$, and $x7=(a7+4\times b1)/5$ in the odd-number fields; in the even-number fields, $x2=(4\times a8+b2)/5$, $x4=(3\times a8+2\times b2)/5$, $x6=(2\times a8+3\times b2)/5$, and $x8=(a8+4\times b2)/5$. Data on which the above-described correction has been performed with respect to the error blocks is sent to a selecting circuit 12.

Next, a description will be given of an operation with the inter-frame interpolation of data of the error blocks. The image data from the 8H delay circuit 2 is sent to a switching circuit 3. Also, data of one frame, previous to the current frame, which is finally corrected data, is input to the switching circuit 3. Usually, when correctly decoded data has been input, the switching circuit 3 is switched to the "a" side, selecting the output from the 8H delay circuit 2. When error data is input, the switching circuit 3 is switched to the "b" side, in accordance with the error flag from the 8H delay circuit 14, replacing the data of the error block with data of one frame previous thereto and outputting it to a frame-8H delay circuit 4. As described above, by switching the switching circuit 3 in accordance with the error flag, inter-frame interpolation is realized.

Next, a description will be given of the operation of a movement detecting circuit 17; for example, an operation for blocks surrounding the error block, and, an error block movement estimation operation based on the former operation.

The operation of the movement detecting circuit 17 will be explained first. Correct data output from the switching circuit 3 is sent to the frame-8H delay circuit 4, where the data which has been sent and received is delayed by one frame-8H. This is, the frame-8H delay circuit 4 obtains data which is delayed by just one frame with respect to the input data. The data output from the frame-8H delay circuit 4 is sent to the differential absolute-value adding and integrating circuit 7. Data which is delayed by one frame, with respect to the input data, and the input data, are input to the differential absolute-value adding and integrating circuit 7, where the sum of the differential absolute values in each pixel units is determined for each data. The sum is integrated in units of blocks of 8×4 pixels, and the integrated value is output to a movement estimation circuit 11 and a 4H delay circuit 8. The 4H delay circuit 8 delays the integrated value in block units by four lines and outputs it to a 4H delay circuit 9 and a frame delay circuit 10. The integrated values in block units are further delayed by 4 lines and 1 line, by the 4H delay circuit 9 and the frame delay circuit 10, respectively, and the values are output to the movement estimation circuit 11.

An explanation will now be given of how the output (output ①) from the differential absolute-value adding and integrating circuit 7, the output (output ②) from the 4H delay circuit 9 and the output (output ③) from the frame delay circuit 10, correspond to the input data. Output ① is the sum of absolute values of the differential between the input data blocks and the data blocks of one frame previous to the input data blocks. Output ② is the sum of absolute values of the differential between the data blocks on two blocks (for 8 lines) in the same field as in the input data blocks and the data blocks of one frame previous to the input data blocks. Output ③ is the sum of absolute values of the differential between the data blocks of one frame previous to the current one on one block (for 4 lines) in the same field as in the input data blocks and the data blocks of two frames previous to the the input data blocks. In other words, the sum of the integrated values of the differential between the input data blocks, the blocks on two blocks above the input data blocks, and the blocks of the one frame previous to the one block above the input data blocks, are simultaneously input to the movement estimation circuit 11, in units of 8×4 pixels.

The relationship between this error block and the motion detection block input to the movement estimation circuit 11 will be explained with reference to FIG. 5. In FIG. 5, 8×4 pixels are shown as one block in field units. Assuming that the current input data block is block C, in this embodiment, as described above, the sum (the above-described output ②) of the absolute values of differential between block A of field 0 in frame #n and block A' of field 0 in frame #n-1, the sum (the above-described output ①) of absolute values of differential between block C of field 0 in frame #n and block C' of field 0 in frame #n-1, and the sum (the above-described output ③) of the absolute values of differential between block B of field 0 in frame #n-1 and block B' of field 0 in frame #n-2, are used to estimate the movement of block X (target block) of field 0 in frame #n. Blocks of one field previous to blocks A, B and C are used as motion detection blocks for estimating the movement of block X of field 1 of frame #n.

Next, a description will be given of the movement estimation operation of the movement estimation circuit 11 based on the differential absolute-value sum of these blocks. As described above, the differential absolute-value sum of three blocks is output to the movement estimation circuit 11. In addition to this, an error flag is output from an error pattern detecting circuit 15.

The error pattern detecting circuit 15 is formed of an error flag delay circuit, an error flag from the 8H delay circuit 14 being input to the circuit 15. Upon receiving this error flag, the error pattern detecting circuit 15 checks whether there is an error in each of the above-mentioned blocks A, B and C, for estimating the movement of the target block. In this embodiment, when there is an error in block X shown in FIG. 5, the error flags of blocks A and C (blocks vertically adjacent to block X) and block B (block one block before block X at the same position as that of block X on the screen) are detected. All of these three blocks are used for movement estimation purposes, and the error flags of these three blocks are output to the movement estimation circuit 11.

The movement estimation circuit 11 adds the differential absolute-value sum of the blocks having no error data from among the three blocks used for movement estimation purposes, and compares the sum with a predetermined threshold value, corresponding to the number of blocks having no error data, in order to determine whether there is a movement in the target block (moving image) or no movement (still image). However, when there is error data in blocks A and C shown in FIG. 5, this is unconditionally determined to be a still image because an intra-field correcting operation cannot be performed. The result of this determination (specifically, 1 for a moving image, and 0 for a still image) is input to the selecting circuit 12.

Intra-field correction data from the intra-field correction circuit 5 and inter-frame corrected data are output to the selecting circuit 12. An output signal, serving as inter-frame correction data from the frame-8H delay circuit 4, is delayed for 8H by an 8H delay circuit 6, to synchronize the timing at which the inter-frame correction data is output to the selecting circuit 12 with the timing at which the result of the motion detection from the movement estimation circuit 11 is output to the selecting circuit 12. That is, for the movement estimation circuit 11 to determine the movement of block X in FIG. 5, the differential absolute-value sum of block C is necessary. For this reason, the output signal is delayed for 8H, which corresponds to a difference between the topmost line of block X, and the bottommost line of block C, so as to synchronize the above timings with each other. In contrast to the above, the timing at which data is output from the intra-field correction circuit 5 is synchronized with the output timing of the movement estimation circuit 11. Therefore, there is no need for delaying the output signal.

As described above, both correction data and the motion detection result are input to the selecting circuit 12. When the result of the motion detection indicates a moving image, intra-field correction data is selected, and when the result indicates a still image, inter-frame correction data is selected, and it is output from an output terminal 16. The selecting circuit 12 usually selects the output from the intra-field correction circuit 5. Correctly decoded data is passed through the intra-field correction circuit 5, without change, and output from the output terminal 16.

As described above, in this embodiment, the movement of the error block containing an uncorrectable image data like the nondecodable image data is estimated on the basis of the differential absolute-value sum between the adjacent upper and lower blocks of the same field as that of the error block and the block of one frame previous to the current one, and, on the basis of the error pattern based on the error condition of each block, correction data of the error data being appropriately selected on the basis of the result of this estimation. Therefore, it is possible to obtain an image having reduced visual deterioration. In addition, even when data within the same field becomes collectively erroneous, a satisfactory image can be obtained since an inter-frame adjustment is automatically made.

Although in this embodiment adjacent upper and lower blocks, in the same field as that of the target block, are selected as motion detection blocks, the blocks are not limited to these blocks; instead, blocks surrounding the target block may also be selected. If blocks to the left and right of the target block are selected, the same advantage as that obtained in this embodiment can be obtained.

When the blocks both above and below the target block contain error data, inter-frame interpolation is performed unconditionally as was explained in the above-mentioned embodiment. That is, only when the blocks both above and below the target block do not contain error data, intra-field interpolation is utilized. However, when a code error occurs, the error data is propagated over a plurality of blocks as described earlier. Therefore, it is not necessarily possible to decode the blocks both above and below the target block. When at least one of the upper and lower blocks cannot be decoded, inter-frame interpolation must be performed, as described above.

Next, the second embodiment will be described below in detail. In the second embodiment, the above-described points are improved, movement estimation can be performed with a high degree of accuracy, and the possibility that intra-field interpolation can be performed is high.

Figure 6:
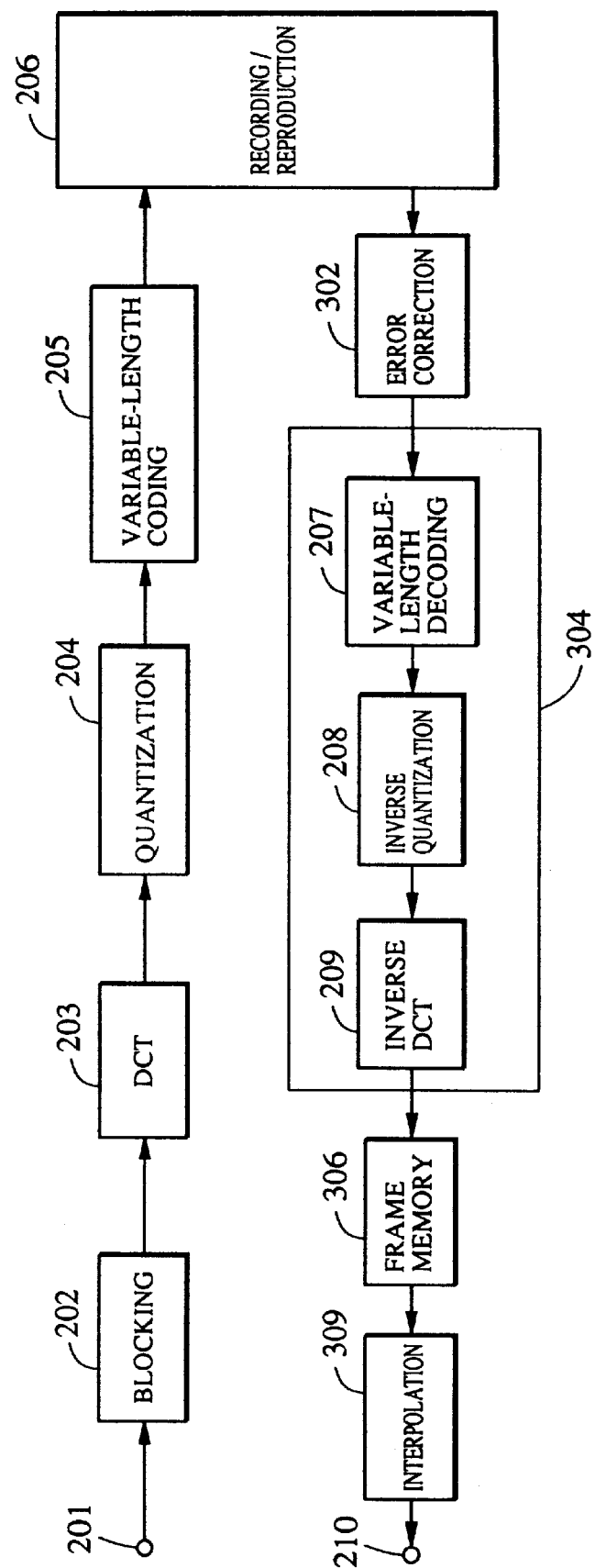
FIG. 6 is a block diagram illustrating the construction of the digital VTR, and also illustrating the data flow in the first embodiment of the present invention.

FIG. 6 is a block diagram illustrating the entire construction of a digital VTR in accordance with the second and third embodiments of the present invention. The operation for recording image signals will be explained first. As shown in FIG. 6, digitized image data is input from an input terminal 201 and formed into blocks in frame units in units of 8×8 pixels by a blocking circuit 202. The image data is then orthogonally transformed by a DCT circuit 203 from a space region to a frequency region.

The image data converted into the frequency region is quantized by a quantization circuit 204 and coded by a variable-length coding circuit 205, thus obtaining a desired data transfer rate. The coded data is then recorded on a recording medium by a recording and reproducing circuit 206.

Data reproduced by the recording and reproducing circuit 206 is input to an error correcting circuit 302 where code errors are corrected, and is then decoded by a variable-length decoding circuit 207. After the decoded data is inversely quantized by an inverse quantization circuit 208, and then inversely DCTed by an inverse DCT circuit 209, the data is converted from data of a frequency region into data of a space region. The variable-length decoding circuit 207, the inverse quantization circuit 208, and the inverse DCT circuit 209 together constitute a single block decoding circuit 304. The output from the inverse DCT circuit 209 is written in a frame memory 306. The data written in the frame memory 306 is read out in synchronization with the raster scan of a monitor or the like, and interpolation is performed on nondecodable data by an interpolation circuit 309, after which the data is output from an output terminal 210 and displayed on the monitor or the like.

Next, the digital VTR of the second embodiment of the present invention will be explained with reference to FIGS. 7 to 12.

Figure 7:
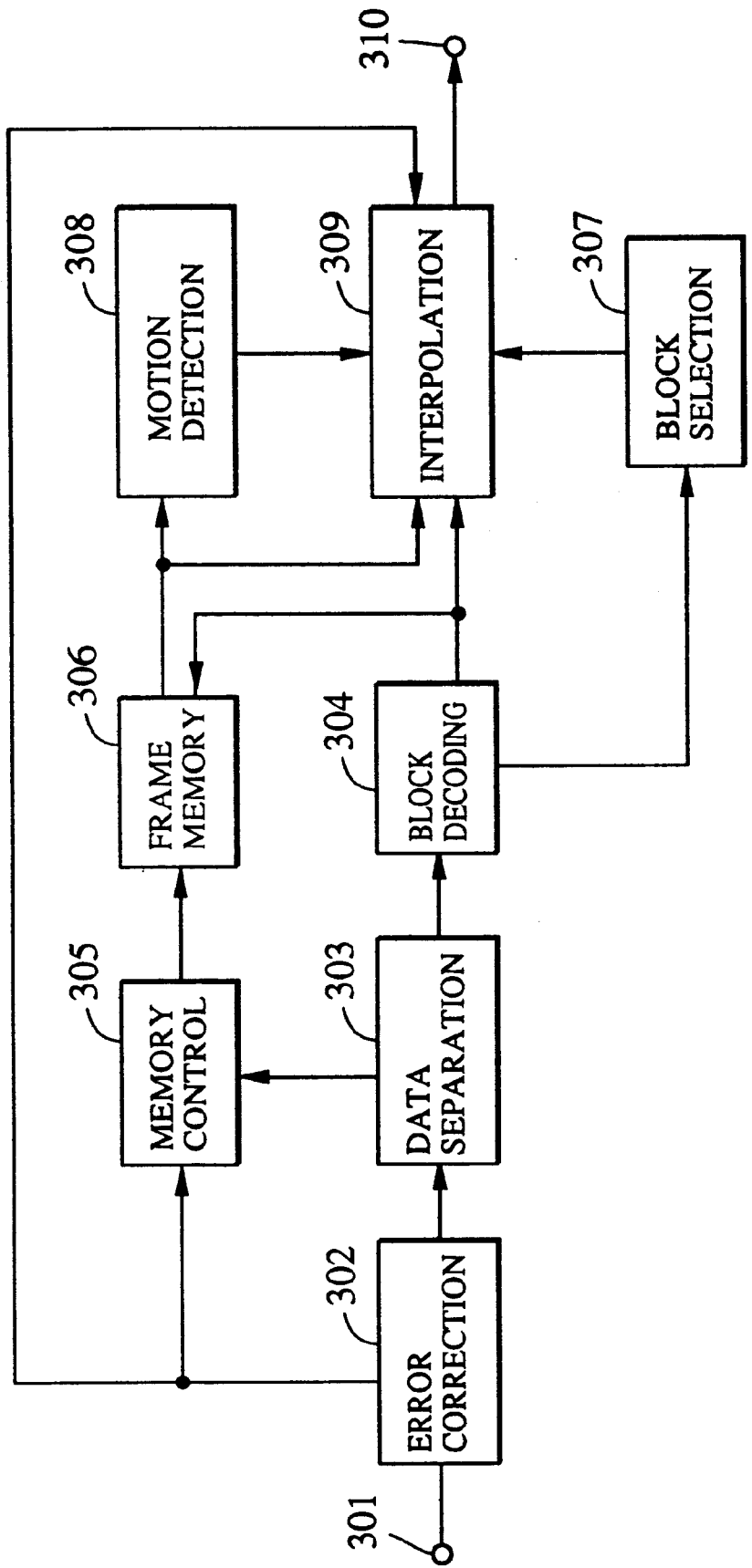
FIG. 7 is a block diagram illustrating the construction of a digital VTR in accordance with a second embodiment of the present invention.

In FIG. 7, image signals reproduced from a recording medium, such as a magnetic tape, are input from an input terminal 301. A code error correction operation is then performed by the error correcting circuit 302; when the code error cannot be corrected, an error flag, indicating that the code error cannot be corrected, is output in block units. The image signals in which the code errors are corrected by the error correcting circuit 302 are input to a data separating circuit 303, where they are separated into block address data, indicating the position of each data on the screen, and image data. The address data is output to a memory control circuit 305, and the image data is output to the block decoding circuit 304.

The block decoding circuit 304 outputs the decoded image data to the frame memory 306 in block units, counts the number of data decoded correctly within the blocks, and outputs the decoded data (hereinafter referred to as decoded level data) to a block selecting circuit 307. The memory control circuit 305 determines the writing addresses of the decoded image data of each block in the frame memory 306 on the basis of the block address data from the data separating circuit 303, and determines whether or not the decoded image data of a corresponding block should be written on the basis of the error flag output from the error correcting circuit 302. That is, if the error flag is output from the error correcting circuit 302 and the image data is not written in the frame memory 306, the image data of the previous frame remains as it is at that address. Image data of each frame is read out from the frame memory 306, in block units, in the order of raster scan.

The block selecting circuit 307 determines the decoded state of the blocks adjacent to the nondecodable block (hereinafter referred to as an error block) on the basis of the decoded level data from the block decoding circuit 304, and the interpolation circuit 309, at a stage posterior to that of the circuit 304, determines the blocks which will be used for interpolation. The operation of the block selecting circuit 307 will be explained below with reference to FIGS. 8 and 9.

Figure 8:
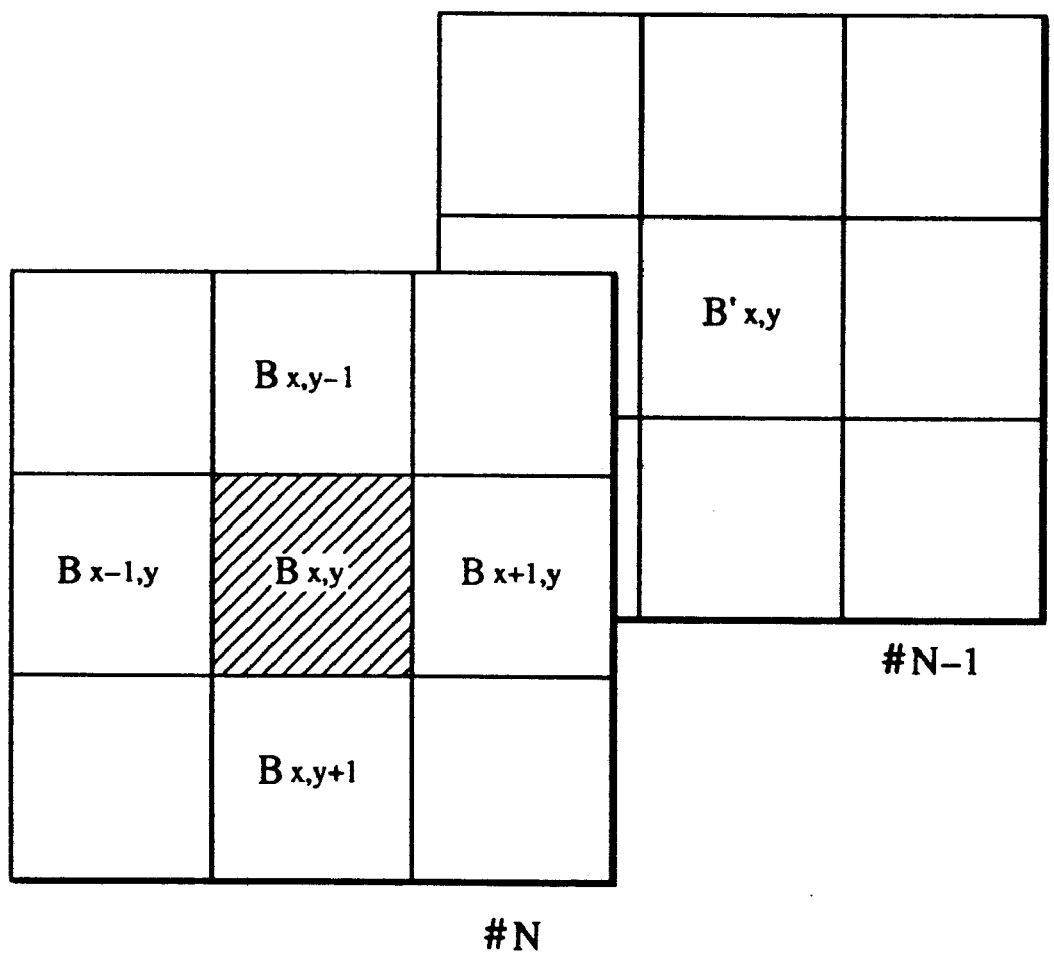
FIG. 8 is an illustration of an inter-field interpolation in accordance with the second embodiment of the present invention.

FIG. 8 is an illustration of the operation of the block selecting circuit 307 and the interpolation circuit 309 in this embodiment. Each square in the figure indicates one coded block, the actual arrangement of these blocks on the screen being illustrated. $B'_{x,y}$ is a block at the same position as that of $B_{x,y}$ of frame #N, at the previous frame #N−1.

Figure 9:
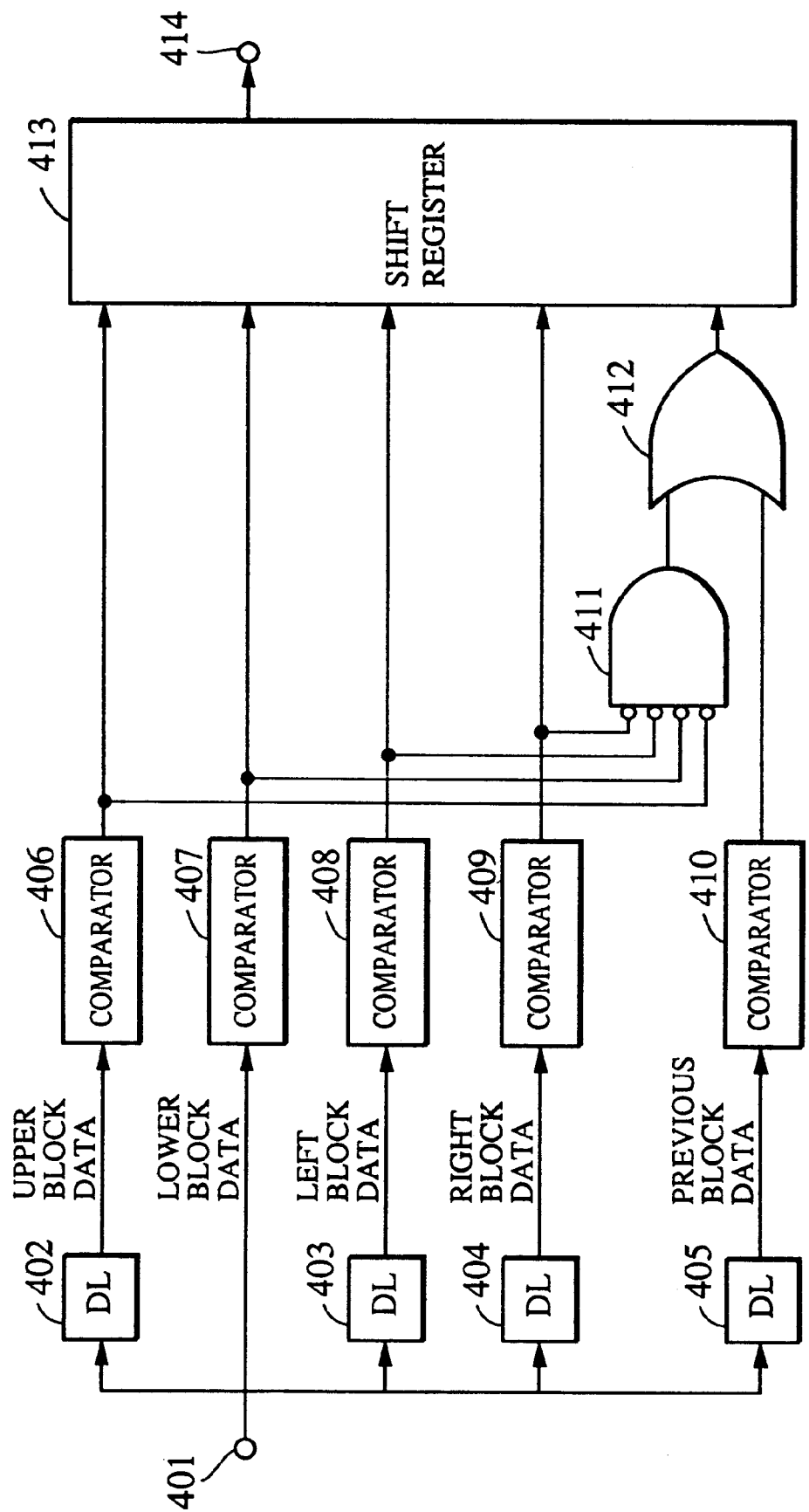
FIG. 9 is a block diagram illustrating the construction of a block selecting circuit in the apparatus of FIG. 7.

FIG. 9 is a block diagram illustrating the construction of the block selecting circuit 307. In FIG. 9, it is assumed that decoded level data for block $B_{x,y}$ in FIG. 8 has been input to an input terminal 401. DL 402, DL 403, DL 404 and DL 405 are delay circuits for delaying input decoded level data, in which circuits delay times are set so that decoded level data for blocks $B_{x,y-1}$, $B_{x-1,y}$, $B_{x+1,y}$, and $B'_{x,y}$ in FIG. 8 is output, respectively. Decoded level data of blocks $B_{x,y-1}$, $B_{x-1,y}$ $B_{x+1,y}$, and $B_{x,y+1}$ which are respectively above, to the left, to the right and below and adjacent to block $B_{x,y}$ is input to comparators 406 to 409, respectively, this data being compared with predetermined threshold values. As regards a block in which a specified number or more of data has been decoded (i.e., a block whose decoded level of data is at a predetermined value or more), a high level signal indicating that that block can be used for intra-field interpolation (hereinafter referred to as a block usable flag) is output.

When block $B'_{x,y}$ of the frame previous to the current frame has been interpolated, because the correlation between the pixels becomes low, this block is not used for inter-frame interpolation. However, when none of the blocks above, below, to the left and to the right of the block $B_{x,y}$ are usable for intra-field interpolation, the block $B'_{x,y}$ is used for inter-frame interpolation because intra-field interpolation cannot be performed. This determination is performed in the following way.

The decoded level data of block $B'_{x,y}$ of the previous frame is input to a comparator 410 where it is compared with a threshold value. When the result shows that block $B'_{x,y}$ can be completely decoded, that is, when block $B'_{x,y}$ does not contain error data, a high-level signal is output; when block $B'_{x,y}$ cannot be completely decoded and has been interpolated, a low-level signal is output. A signal such that a block usable flag indicating that the blocks adjacent to the error block, above, below, to the left, and to the right, of the block $B_{x,y}$ is input from the comparators 406 to 409, respectively, to an AND circuit 411. When none of the blocks above, below, to the left or to the right of the block $B_{x,y}$ can be used for intra-field interpolation, that is, when the signals from the comparators 406 to 409 are at a low level, a high-level signal is output. The output from the comparator 410 and the output from the AND circuit 411 is input to an OR circuit 412, from which the computation operation is output as a block usable flag for block $B'_{x,y}$ of the previous frame.

According to the above description, as the decoded level data of the interpolated block is lower than the threshold value, the interpolated block is not used to intra-field interpolation. So, in this embodiment, it will be performed the intra-field interpolation to the error block without using low correlation image data.

The block usable flag of each block is input from the comparators 406 to 409, and the OR circuit 412, to a shift register 413, and are output in sequence to an output terminal as data indicating a block usable for intra-field interpolation.

Referring back to FIG. 7, a motion detection circuit 308 determines the presence or absence of the movement of the error block by using data of the adjacent blocks. When it is determined that there has been a movement, a high-level signal (hereinafter referred to as movement data) is output. The operation of the motion detection circuit 308 is the same as in said first embodiment. Image data decoded by the block decoding circuit 304 is input to the interpolation circuit 309 where interpolation is performed on the basis of the error flag, the block usable flag and the movement data. Next, a description will be given of the operation of the interpolation circuit 309 with reference to FIG. 10.

Figure 10:
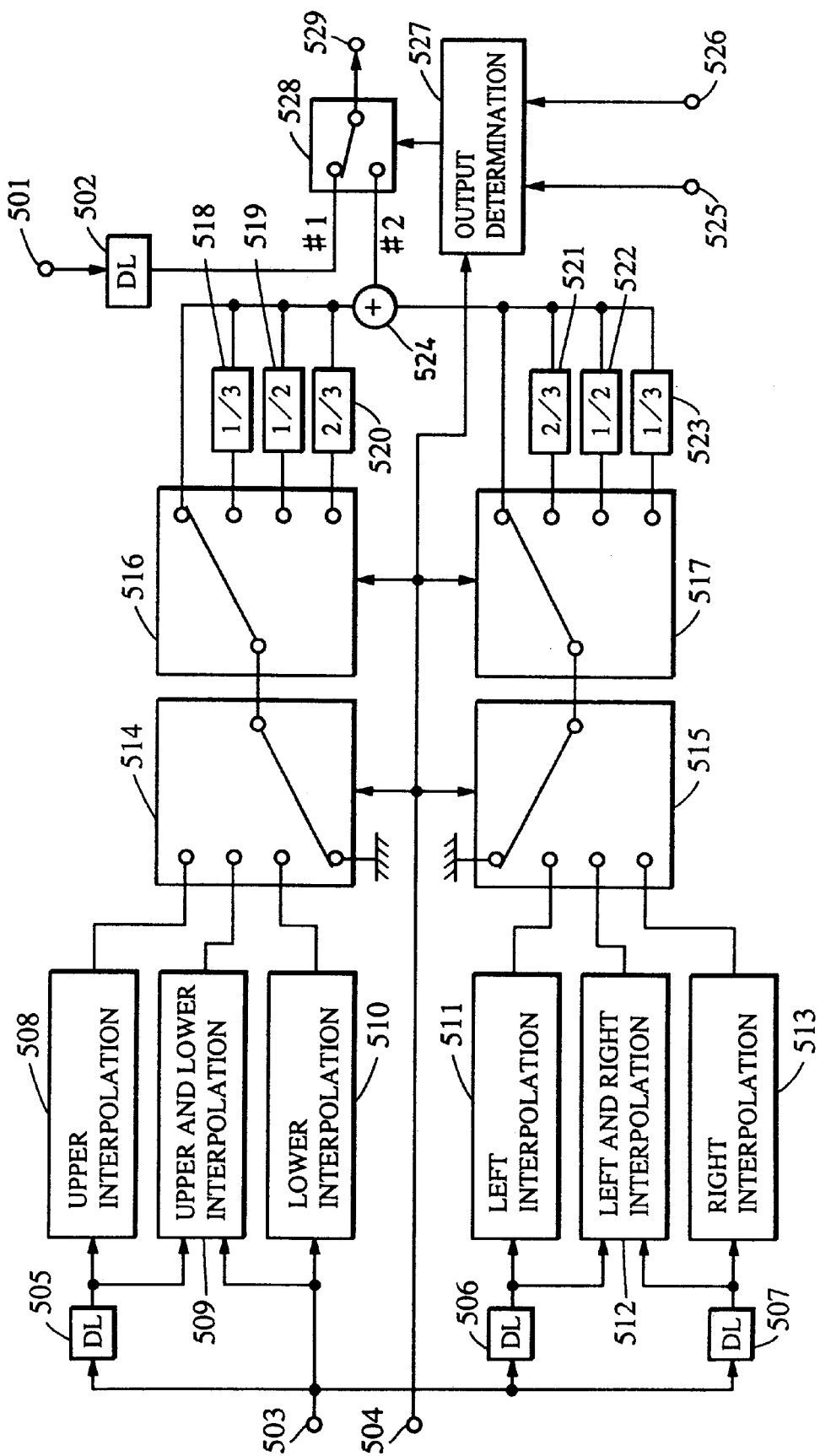
FIG. 10 is a block diagram illustrating the construction of an interpolation circuit in the apparatus of FIG. 7.

FIG. 10 is a block diagram illustrating the construction of the interpolation circuit 309. It is assumed that decoded image data of $B_{x,y+1}$ in FIG. 8 has been input from the block decoding circuit 304 to an input terminal 503. DL 505, DL 506, and DL 507 are delay circuits in which delay times are set so that decoded image data of blocks $B_{x,y-1}$, $B_{x-1,y}$, and $B_{x+1,y}$ are output, respectively. An upper interpolation circuit 508, an upper and lower interpolation circuit 509, and a lower interpolation circuit 510, are intra-field interpolation circuits which create intra-field interpolation data by using data of the blocks vertically adjacent to the error block. A left interpolation circuit 511, a left and right interpolation circuit 512 and a right interpolation circuit 513, are intra-field interpolation circuits which create intra-field interpolation data by using data of the blocks horizontally adjacent to the error block. The upper interpolation circuit 508, the upper and lower interpolation circuit 509 and the lower interpolation circuit 510 create vertical intra-field interpolation data of block $B_{x,y}$ by using block $B_{x,y-1}$, blocks $B_{x,y-1}$, and $B_{x,y+1}$, and block $B_{x,y+1}$, respectively, the interpolation data then being output to a selecting switch 514. The left interpolation circuit 511, the left and right interpolation circuit 512, and the right interpolation circuit 513 create horizontal intra-field interpolation data of block $B_{x,y}$ by using block $B_{x-1,y}$, blocks $B_{x-1,y}$ and $B_{x+1,y}$, and block $B_{x+1,y}$, respectively, the interpolation data then being output to a selecting switch 515. When one of the adjacent blocks above and below and to the left and right is nonusable for intra-field interpolation, intra-field interpolation is performed by using data such that data of the line in any usable one of the blocks, which line is nearest to the error block, is weighted according to the distance.

The block usable flag is input from the block selecting circuit 307 to an input terminal 504, and the selecting switches 514 and 515 select, respectively, a vertical and a horizontal intra-field interpolation method on the basis of the block usable flag. When both the upper and lower blocks are nonusable and when both the left and right blocks are nonusable, the selecting switches 514 and 515 are connected to the GND. The output from the selecting switches 514 and 515 is input to switches 516 and 517 which are switched according to the number of the blocks used for vertical and horizontal interpolations, with respect to all the blocks used for intra-field interpolation, so that weighting by values shown in the figure is performed by coefficient multiplying circuits 518 to 523. For example, when all the blocks above and below and to the left and right are usable, the switches 516 and 517 are connected to the ½ multiplying circuits 519 and 522, respectively, so that the output from the selecting switches 514 and 515 is multiplied by ½ and then output. An adder 524 adds vertical and horizontal weighted intra-field interpolation data and outputs it to the #2 side of a selecting switch 528.

Image data from the frame memory 306 is input to an input terminal 501. DL 502 is a delay circuit in which a delay time is set so that when the adder 524 is outputting intra-field interpolation data for $B_{x,y}$, image data of block $B'_{x,y}$ is output. The DL 502 outputs decoded image data when $B_{x,y}$ is decodable and outputs image data of block $B'_{x,y}$ in the previous frame when $B_{x,y}$ is nondecodable.

Movement data of block $B_{x,y}$ is input from the motion detection circuit 308 to an input terminal 525. An error flag is input to an input terminal 526 from the error correcting circuit 302 when uncorrectable data is present in the block $B_{x,y}$. An output determination circuit 527 controls the selecting switch 528 on the basis of the usable block data, the movement data and the error flag from the input terminal 504, in order to determine image data to be output to an output terminal 529. Usually, the selecting switch 528 is connected to #1 when image data of a correctly decoded block is output and when inter-frame interpolation data is output. When intra-field interpolation data is output, the selecting switch 528 is connected to #2.

Intra-field interpolation data is selected in cases A and B shown in FIG. 11. In FIG. 11, the error flag is a flag which indicates whether or not block $B_{x,y}$ is decodable and which reaches a high level when $B_{x,y}$ is nondecodable. The intra-field interpolation flag is a flag which indicates whether or not intra-field interpolation is possible and which reaches a high level when intra-field interpolation is possible. The movement data is data which indicates the presence or absence of block movement of block $B_{x,y}$ and which reaches a high level when there is a movement. The "–" symbol indicates the flag is in an independent state.

Figure 12:
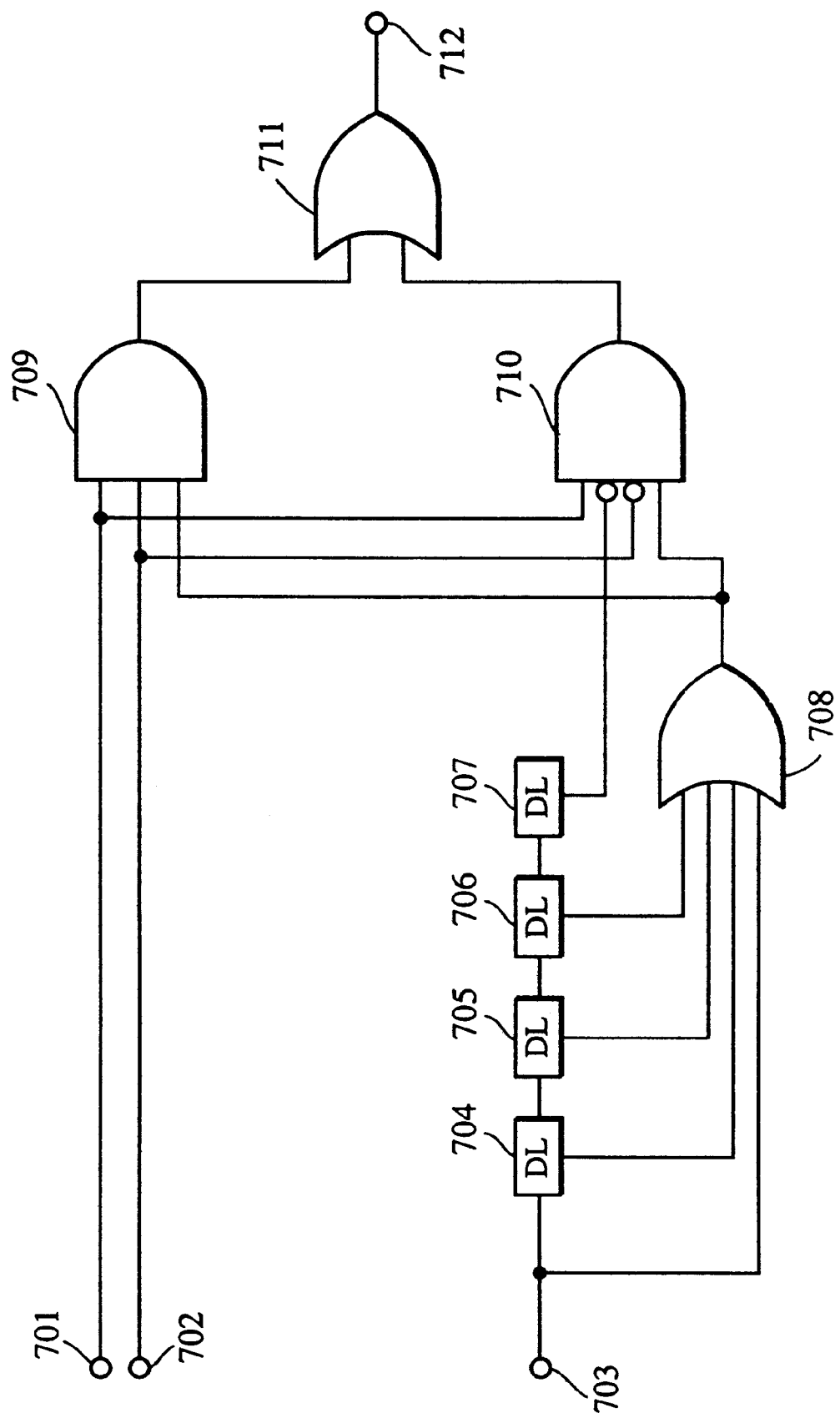
FIG. 12 is a block diagram illustrating the construction of an output determination circuit in the apparatus of FIG. 7.

FIG. 12 illustrates the construction of the output determination circuit 527 for making the determination shown in FIG. 11. In FIG. 12, the error flag of block $B_{x,y}$ is input to the input terminal 701; the movement data of block $B_{x,y}$ to the input terminal 702; and the block usable flag for the block $B_{x,y}$ used for intra-field interpolation to the input terminal 703. It is assumed that the block usable flag for block $B_{x,y+1}$ has been input to the input terminal 703. At this time, delay circuits DL 704, DL 705, DL 706, and DL 707 delay so that the block usable flag indicating that the right block, the left block, the upper block and the block one frame previous to block $B_{x,y}$, is output. The output from the DL 707 is used as an inter-frame interpolation flag.

An OR circuit 708 calculates OR of the block usable flag of the upper and lower and left and right blocks. When at least one block is usable, intra-field interpolation is assumed to be possible and a high-level signal is output, which signal is used as an intra-field interpolation flag.

An AND circuit 709 calculates AND of the error flag, the movement data and the intra-field interpolation flag in order to make a determination for case A in FIG. 11. An AND circuit 710 calculates AND of the error flag, the movement data, the intra-field interpolation flag and the inter-frame interpolation flag in order to make a determination for case B in FIG. 11.

An OR circuit 711 calculates OR of the outputs from the AND circuits 709 and 710, and outputs it to the output terminal 712. The selecting switch 528 of FIG. 10 is connected to the #1 side when the output is at a low level so that inter-frame interpolation data of correctly decoded data is output, and is connected to the #2 side when the output is at a high level so that intra-field interpolation is output.

As described above, in this embodiment, it is possible to perform interpolation by using satisfactorily decoded blocks, by selecting blocks used for interpolation according to the decoded state of the blocks adjacent to the error block. It is also possible to perform intra-field interpolation even if only one of the blocks is decodable. As a result, the quality of a reproduced image can be improved.

Next, the third embodiment of the present invention will be explained with reference to FIGS. 13 to 17. Components in this embodiment which are the same as in the second embodiment are given the same reference numerals, and thus a detailed explanation thereof is omitted.

Figure 13:
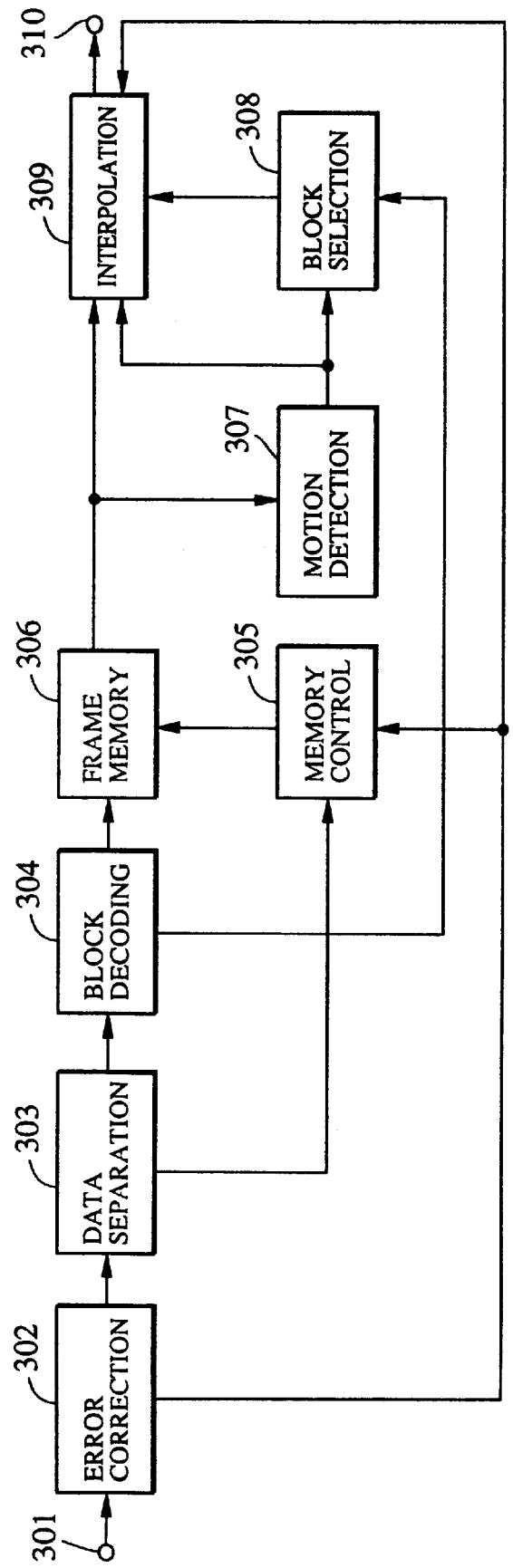
FIG. 13 is a block diagram illustrating the construction of a digital VTR in accordance with a third embodiment of the present invention.

In FIG. 13, the block decoding circuit 304 does not output decoded level data to the interpolation circuit 309, and the block selecting circuit 307 outputs the movement of the relevant block to the motion detection circuit 308.

In this embodiment, the block selection circuit 308 selects a block used for intra-field interpolation on the basis of the movement data from the motion detection circuit 307 and the decoded level data from the block decoding circuit 304. The block selection circuit 308 selects, as the block used for intra-field interpolation, the block applicable to any of the conditions described below from among the blocks surrounding the error block, which are above and below and to the left and right of the error block:
(A) block which could be decoded
(B) block in which interpolation was performed by inter-frame interpolation, from among blocks which could not be decoded.

Figure 14:
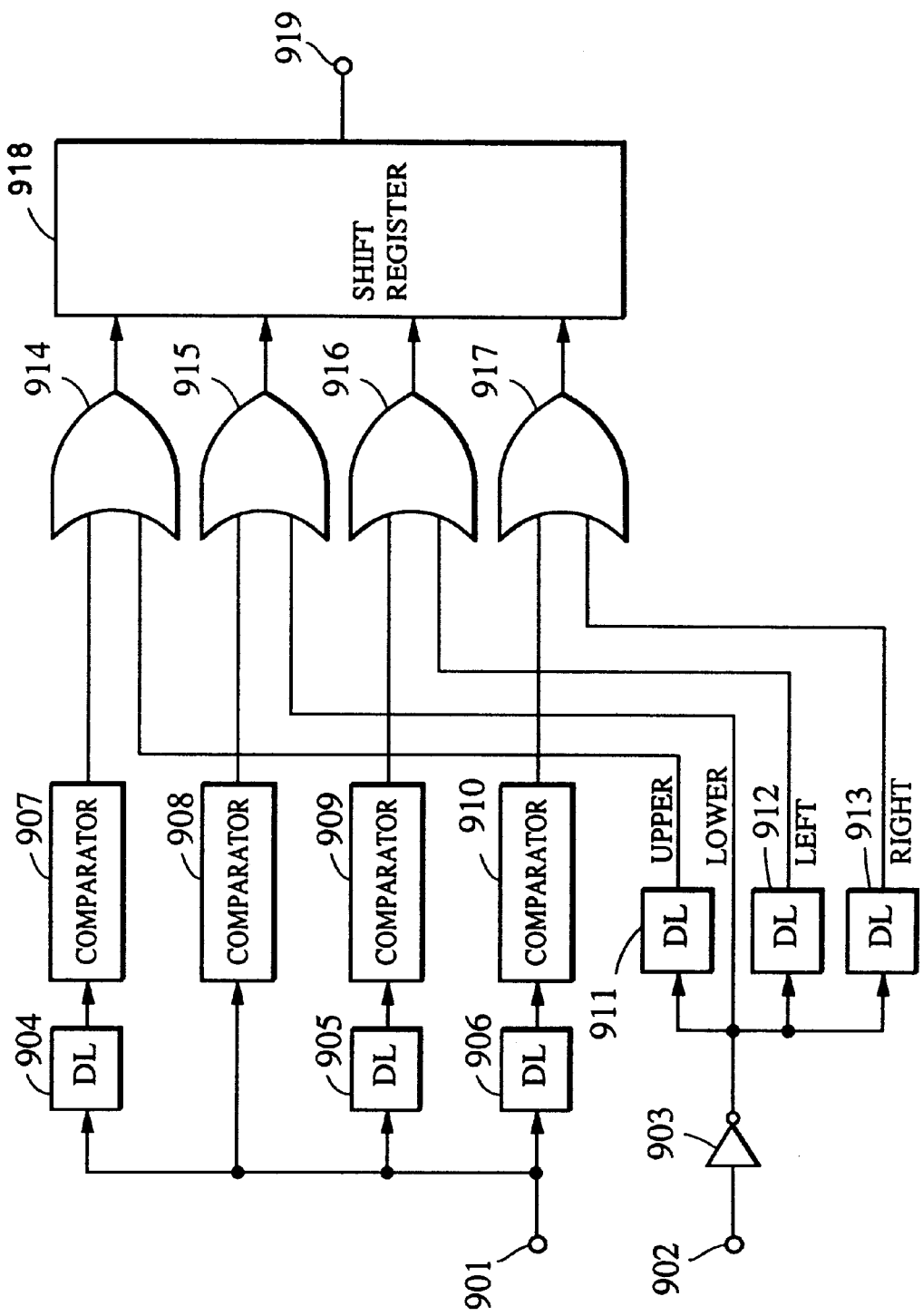
FIG. 14 is a block diagram illustrating the construction of a block selecting circuit in the apparatus of FIG. 13.

An example of the construction of the block selection circuit 308 for selecting a block applicable to any of these conditions is shown in FIG. 14.

Decoded level data is input from the block decoding circuit 304 to an input terminal 901. If it is assumed that decoded level data of the lower block $B_{x,y+1}$ adjacent to the error block has been input to the input terminal 901, delay times are set in delay circuits DL 904, DL 905, and DL 906 so that comparators 907, 909 and 910 output the decoded level data of block $B_{x,y-1}$, $B_{x-1,y}$, and $B_{x+1,y}$, respectively.

Movement data from the motion detection circuit 307 is input to the input terminal 902 and then inverted by a NOT circuit 903. If it is assumed that the input terminal 902 inputs the movement data of block $B_{x,y+1}$ as described above, delay times are set in delay circuits DL 911, DL 912, and DL 913 so that inverted movement data of respective blocks surrounding the above-described error block is output.

DL 904, DL 905, and DL 906 output decoded level data of the blocks surrounding the error block, which are above and below and to the left and right of the error block. The comparators 907 to 910 compare the decoded level data of the blocks surrounding the error block, which are above and to the left and right of the error block, with a predetermined value in order to determine whether the respective blocks have been completely decoded. When decoding was possible, a high-level signal is output. The above case conforms to the conditions of the above-described case (A). The output from DL 911, NOT circuit 903, DL 912, and DL 913 becomes a high-level signal when there is no movement in the blocks surrounding the error block, which are above and below and to the left and right of the error block. The block in which it is determined that no movement occurred is a part of the block applicable to the conditions of the above-described case (A) when decoding was possible, and is a block applicable to the conditions of the above-described case (B) when decoding was not possible because it becomes an image in which inter-frame interpolation using data of the previous frame has been performed.

OR circuits 914 to 917 output a block usable flag regarding the blocks surrounding the error block, which are above and below and to the left and right of the error block, respectively. Data of the upper block is input to the OR circuit 914 from the comparator 907 and DL 911; data of the lower block is input to the OR circuit 915 from the comparator 908 and the NOT circuit 903; data of the left block is input to the OR circuit 916 from the comparator 909 and DL 912; and data of the right block is input to the OR circuit 917 from the comparator 910 and DL 913. And then, a block usable flag is output regarding the block applicable to any of the conditions of the above-described cases (A) and (B). A shift register 918 outputs the block usable flag of each block from the OR circuits 914 to 917, in sequence, as usable block data to an output terminal 919.

Figure 15:
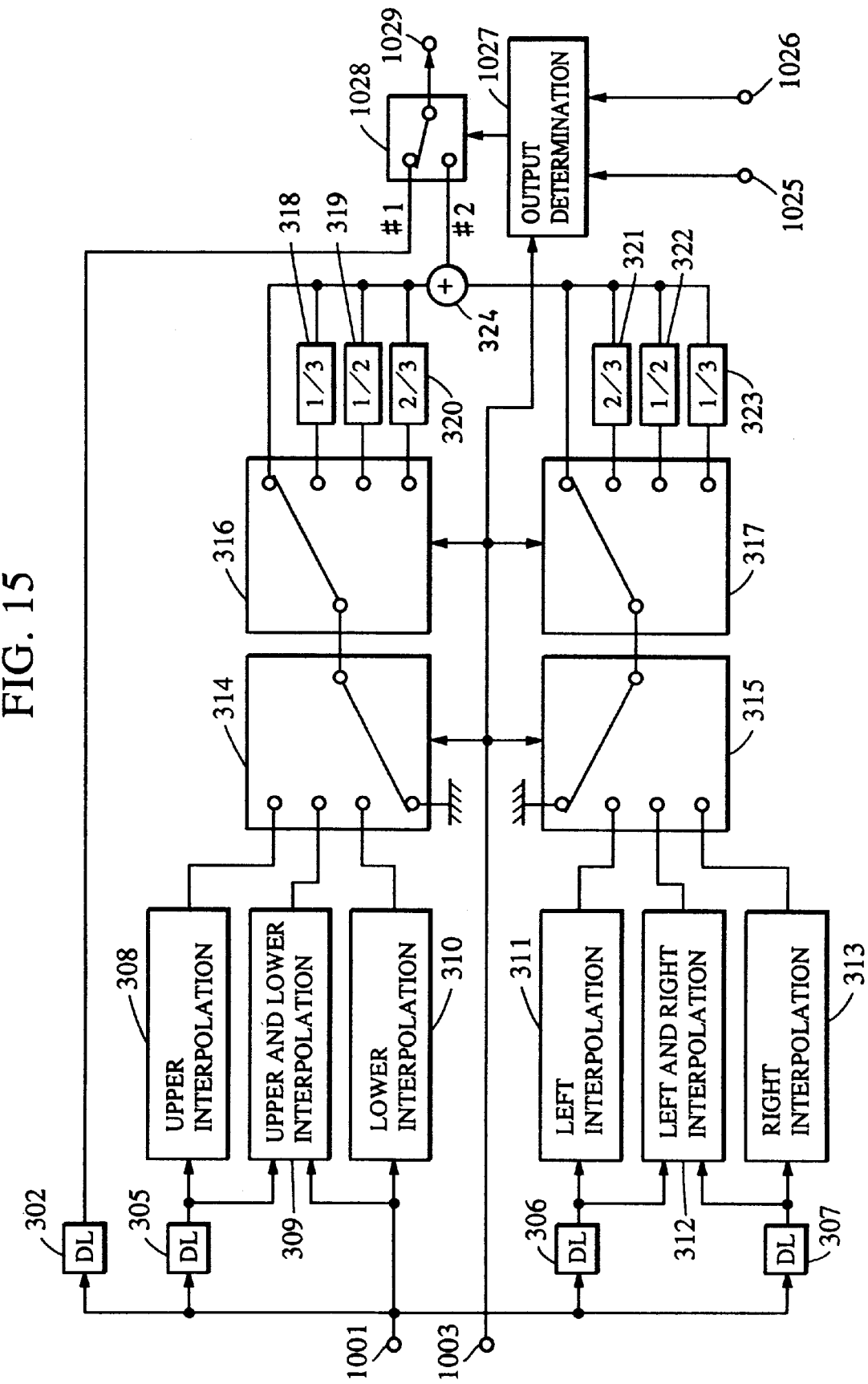
FIG. 15 is a block diagram illustrating the construction of an interpolation circuit in the apparatus of FIG. 13.

FIG. 15 illustrates an example of the construction of the interpolation circuit 309. In FIG. 15, image data from the frame memory 306 is input to an input terminal 1001, and usable block data is input to an input terminal 1003. After the interpolation operation is performed in the same way as in the above-described second embodiment, respective interpolation data for inter-frame interpolation and intra-field interpolation are output to a selecting switch 1028. The movement data of the nondecodable blocks is input from the differential absolute-value adding and integrating circuit 7 to the block selecting circuit 307, and the error flag is input from the error correcting circuit 302 to an input terminal 1026. An output determination circuit 1027 controls the selecting switch 1028 on the basis of the usable block data, the movement data and the error flag so that image data to be output to an output terminal 1029 is determined.

Figures 16, 17:
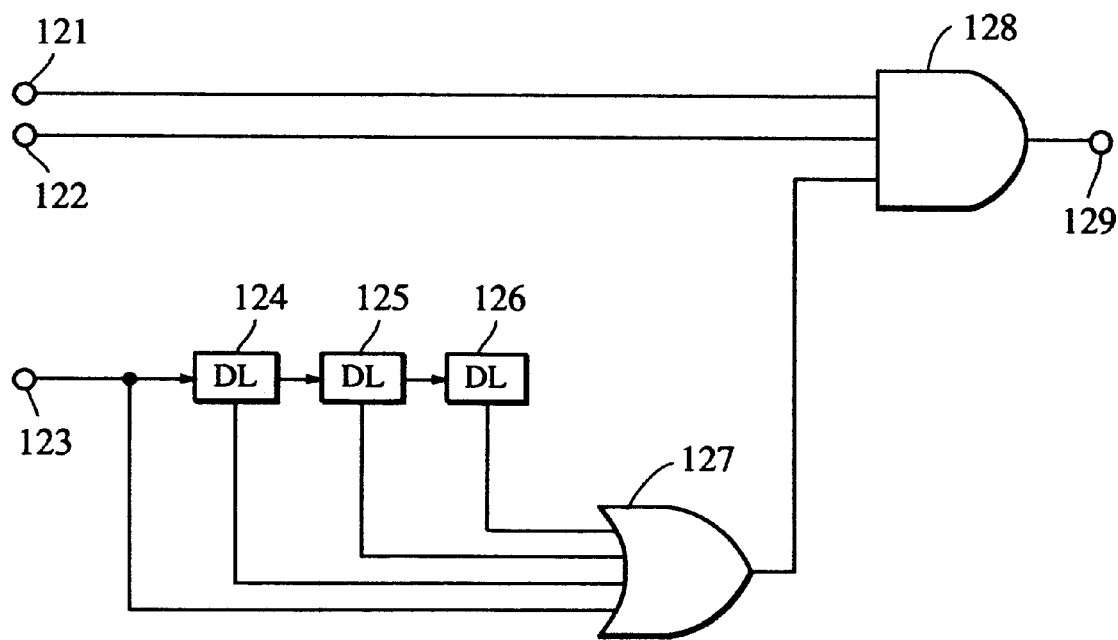
FIG. 16 is an illustration of the operation of an output determination circuit in the apparatus of FIG. 13.
FIG. 17 is a block diagram illustrating the construction of an output determination circuit in the apparatus of FIG. 13.

In this embodiment, the intra-field interpolation data is output in the case shown in FIG. 16. The error flag, the intra-field interpolation flag and the movement data in FIG. 16 are the same as in FIG. 10. FIG. 17 illustrates an example of the construction of the output determination circuit 1027 for determining the output of intra-field interpolation data. The error flag is input to the input terminal 121, the movement data of the nondecodable block to the input terminal 122, and usable block data to the input terminal 123. If it is assumed that the block usable flag of block $B_{x,y-1}$, a block adjacent to and below block $B_{x,y}$, is input to the input terminal 123, then, delay circuits DL 124, DL 125, and DL 126 perform delaying so that the usable flag indicating that the right, left and above blocks is output, respectively.

The OR circuit 127 calculates OR of the block usable flags in the blocks above, below, to the left and to the right of the error block. When at least one block is usable, it is assumed that intra-field interpolation is possible and a high-level signal is output. This signal is used as an intra-field interpolation flag.

The AND circuit 128 calculates AND of the error flag, the movement data and the intra-field interpolation flag in order to make the determination as shown in FIG. 16. When applicable, a high-level signal is output to the output terminal 129; when nonapplicable, a low-level signal is output to the output terminal 129. The selecting switch 1028 is connected to the #1 side when the input signal from the output determination circuit 1027 is at a low level and outputs inter-frame interpolation data or decoded data; when the input signal from the output determination circuit 1027 is at a high level, it is connected to the #2 side, and outputs intra-field interpolation data.

In this embodiment, as described above, it is performed intra-field interpolation to the error block by using the block to which inter-frame interpolation was performed among the blocks adjacent to the error block above, below to the left and to the right as though the block cannot be decoded completely, there is more capability of intra-field interpolation.

It is used the block to which inter-frame interpolation was performed among the blocks adjacent to the error block to the intra-field interpolation in this embodiment, for there is high capability of intra-field interpolation and it cannot be in time to performing intra-field interpolation to block $B_{x,y}$ when the block below the error block is an error block and has a movement. Therefore, the intra-field interpolation is performed by only using the block to which the inter-frame interpolation is performed among the blocks adjacent to the error block.

In this embodiment also, by selecting a block used for interpolation according to the decoded state and the interpolated state of the blocks surrounding the error block, it is possible to perform intra-field interpolation by using image data interpolated by inter-frame interpolation even when the surrounding blocks are nondecodable. Therefore, even the interpolated image is in harmony with the image in the vicinity of the former image in terms of time and space and thus a satisfactorily reproduced image can be obtained.

Although the above-described embodiments describe a case in which the present invention is applied to a digital VTR, the present invention can be applied to any case in which image data using block coding is to be reproduced. That is, the present invention can be applied to an apparatus for inputting and decoding data in conformity with MPEG2 standards or the like, and the same advantages as in the above-described embodiments can be obtained.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded a broad interpretation, so as to encompass all such modifications and equivalent structures and functions.

What is claimed is:

1. An image reproducing apparatus for processing a sequence of frames of images, comprising:

reproducing means for reproducing image signals which are divided into a plurality of blocks, each block including a plurality of pixels;

error detection means for detecting errors in the image signals reproduced by said reproducing means, said error detection means generating error information indicating, for each block, whether that block includes at least one error;

motion detecting means, connected to receive the error information, for detecting a motion of a target block in the reproduced image signals by using both a plurality of blocks other than the target block in the reproduced image signals and the error information for the plurality of blocks other than the target block; and constructing means for constructing image signals for the target block according to an output of said motion detecting means.

2. An apparatus according to claim 1, wherein the plurality of blocks other than the target block comprise blocks adjacent to the target block and a block of a position corresponding to the target block, in a frame which is previous to the frame containing the target block.

3. An apparatus according to claim 1, wherein said motion detection means detects the motion by using image signals of blocks other than blocks including the errors.

4. An apparatus according to claim 1, wherein said constructing means comprises an intra-frame constructing circuit for constructing the image signals for the target block by using image signals of a frame containing the target block and an inter-frame constructing circuit for constructing the image signals for the target block by using image signals of a frame other than the frame containing target block.

5. The apparatus according to claim 1, wherein the plurality of blocks other than the target block comprise a block of a frame containing the target block and a block of a frame other than the frame containing the target block.

6. An image signal processing device for processing a sequence of images, comprising:

input means for inputting image signals which are divided into a plurality of blocks, each block including a plurality of pixels;

error detection means for detecting errors in the image signals input by said input means, said error detection means generating error information indicating, for each block, whether that block includes at least one error;

motion detecting means for detecting a motion of images corresponding to image signals of a target block in the input image signals by using image signals of a plurality of blocks other than the target block;

control means, connected to receive the error information, for controlling a detecting operation of said motion detecting means on the basis of the error information for the plurality of blocks other than the target block; and constructing means for constructing image signals for the target block according to an output of said motion detecting means.

7. A device according to claim 6, wherein said constructing means comprises an intra-frame constructing circuit for constructing the image signals for the target block by using image signals of the frame containing the target block and an inter-frame constructing circuit for constructing the image signals for the target block by using image signals of the frames other than the frame containing the target block.

8. A device according to claim 7, wherein said constructing means further comprises an output circuit for outputting image signals from the intra-frame constructing circuit according to an output of said motion detection means indicating an existence of the motion and image signals from the inter-frame constructing circuit according to an output of said motion detection means indicating an absence of the motion.

9. A device according to claim 6, wherein said motion detection means comprises an integration circuit for integrating an inter-frame difference of image signals of the plurality of blocks on a block-by-block basis, and detects the motion of images corresponding to image signals of the target block according to an output of the integration circuit.

10. A device according to claim 9, wherein said control means controls said motion detection means so that the integration circuit integrates the inter-frame difference of the blocks other than the blocks including the errors among the plurality of blocks other than the target block.

11. The device according to claim 6, wherein the plurality of blocks other than the target block comprise a block of a frame containing the target block and a block of a frame other than the frame containing the target block.

12. An image signal processing device according to claim 6, wherein said motion detecting means detects a motion of images corresponding to image signals of the target block by performing a calculating operation with the image signals of the plurality of the blocks other than the target block, and said control means controls the calculating operation on the basis of the data.

13. An image signal processing device for processing a sequence of images, comprising:

input means for inputting image signals which are divided into a plurality of blocks, each block including a plurality of pixels;

correction means for correcting errors in the image signals input by said input means, said correction means generating error information indicating, for each block, whether that block includes at least one error that cannot be corrected by said correction means; and motion detecting means, connected to receive the error information, for detecting a motion of images corresponding to image signals of a target block in the input image signals by using both image signals of a plurality of blocks other than the target block and the error information for the plurality of blocks other than the target block.

14. A device according to claim 13, further comprising:

constructing means for constructing image signals for the target block according to an output of said motion detection means, wherein said constructing means comprises an intra-frame constructing circuit for constructing the image signals for the target block by using image signals of the frame containing the target block, an inter-frame constructing circuit for constructing the image signals for the target block by using image signals of other frames than the frame containing the target block and an output circuit for selectively outputting the image signals from the intra-frame constructing circuit and the image signals from the inter-frame constructing circuit.

15. A device according to claim 14, wherein the output circuit outputs the image signals from the intra-frame constructing circuit according to an output of said motion detection means indicating an existence of the motion and the image signals from the inter-frame constructing circuit according to an output of said motion detection means indicating an absence of the motion.

16. The device according to claim 13, wherein the plurality of blocks other than the target block comprise a block of a frame containing the target block and a block of a frame other than the frame containing the target block.

17. An image reproducing apparatus for processing a sequence of images, comprising:

reproducing means for reproducing image data divided into a plurality of blocks, each block including a plurality of pixels;

error correction means for correcting errors in the image data;

error detection means for detecting, for each block, whether that block includes at least one error which cannot be corrected by said error correction means;

storing means for storing error detection results for the blocks of said error detection means;

motion detecting means, connected to receive the error detection results, for detecting a motion of images corresponding to image data of a target block in the reproduced image data by using both a plurality of blocks other than the target block in the reproduced image data and the error detection results for the plurality of blocks other than the target block; and interpolation means for interpolating the target block according to an output of said motion detecting means.

18. An apparatus according to claim 17, wherein said interpolation means includes an intra-frame interpolation circuit for interpolating the target block by using image data of a frame containing the target block and an inter-frame interpolation circuit for interpolating the target block by using image data of a frame other than the frame containing the target block.

* * * * *

UNITED STATES PATENT AND TRADEMARK OFFICE
CERTIFICATE OF CORRECTION

PATENT NO. : 5,943,444
DATED : August 24, 1999
INVENTOR(S) : TETSUYA SHIMIZU ET AL.

It is certified that error appears in the above-identified patent and that said Letters Patent is hereby corrected as shown below:

COLUMN 2

Line 55, "FIG. 4 is" should read --FIGS. 4A and 4B are--.

COLUMN 3

Line 51, "FIG. 4 is" should read --FIGS. 4A and 4B are--.

COLUMN 4

Line 20, "FIG. 4" should read --FIGS. 4A and 4B--;
  Line 21, "FIG. 4" should read --FIG. 4B--.

COLUMN 8

Line 46, "$B_{x-1,\ y}$" should read --$B_{x-1,y}$,--.

Signed and Sealed this

Eighteenth Day of July, 2000

Attest:

*Attesting Officer*

Q. TODD DICKINSON
*Director of Patents and Trademarks*